United States Patent [19]
Fukuda

[11] Patent Number: 5,094,513
[45] Date of Patent: Mar. 10, 1992

[54] TV-VTR COMPOUND SET

[75] Inventor: Yutaka Fukuda, Daito, Japan

[73] Assignee: Funai Electric Company Limited, Osaka, Japan

[21] Appl. No.: 598,949

[22] Filed: Oct. 17, 1990

[30] Foreign Application Priority Data

May 11, 1990 [JP] Japan .................. 2-49462[U]

[51] Int. Cl.$^5$ .................. A47B 47/00; H04N 5/64
[52] U.S. Cl. .................. 312/7.2; 358/254
[58] Field of Search .................. 358/254; 312/7.2, 108, 312/257.1

[56] References Cited

U.S. PATENT DOCUMENTS

| | | | |
|---|---|---|---|
| 2,917,676 | 12/1959 | Daniels | 312/7.2 X |
| 3,303,323 | 11/1972 | Gallas et al. | 312/7.2 |
| 3,371,977 | 3/1968 | McCabe | 312/257.1 |
| 3,758,716 | 9/1973 | James et al. | 358/254 |
| 4,716,493 | 12/1987 | Zelkowitz | 358/254 X |

Primary Examiner—Joseph Falk
Attorney, Agent, or Firm—Harold Gell

[57] ABSTRACT

Disclosed is a TV and VTR compound set in which a holder for supporting TV's printed circuit board in a space between the inside surface of the cabinet and TV's Braun tube vertically and TV's flyback transformer laterally is newly introduced, by which holder TV's flyback transformer and VTR's picture recording and reproducing head come to be placed apart from each other at the farthest distance possible in the cabinet and the transformer's noise comes to be prevented from interfering with the head and by which not only is TV's transformer's noise prevent from entering VTR's head as mentioned above but also the dimension of the cabinet can be made smaller than that of the conventional cabinet similarly housing TV and VTR and the production cost of the set can be reduced.

4 Claims, 5 Drawing Sheets

TV-VTR COMPOUND SET

FIELD OF THE INVENTION

This invention relates to a combined set which accommodates a television (TV) and a videotape recorder (VTR) in one cabinet. More particularly, it relates to a TV and VTR compound set, in which the noise of the TV's flyback transformer is prevented from interfering with the VTR's picture recording and reproducing head by the special arrangement of their major units.

BACKGROUND OF THE INVENTION

Certainly there has so far been a device that incorporates TV and VTR in on cabinet. Generally in such a device, a TV's cathode ray tube (CRT) is arranged in the upper part and the VTR is arranged on the bottom of the cabinet with the TV's printed circuit board horizontally put in between, so that the TV's flyback transformer and the VTR's picture recording and reproducing head have to be arranged close to each other. On account of that, the transformer's magnetic flux is in line with the direction of the VTR's head and so the transformer's noise tends to interfere with the action of the head. This requires any means, such as shorting rings to deviate the direction of the transformer's magnetic flux, or a shielding plate to reduce or interrupt the transformer's noise. Additionally, since the TV's CRT is disposed above its printed circuit board, tuning the TV by using screws on the printed circuit board or reducing the vertical dimension of the cabinet is difficult. The arrangement of the TV's and VTR's major components in the cabinet is such that there used to be problems inherent to that arrangement in a conventional compound set that affect their performance.

In order to solve the above-mentioned problems, this invention provides a new TV-VTR compound set, in which a VTR unit is disposed on the bottom of the cabinet under the TV's CRT and a holder for supporting the TV's printed circuit board is vertically put in a space between the inside wall of said cabinet and said CRT by means of rails so as to be able to slide on them.

The structure of a TV-VTR compound set of this invention is such that the VTR's picture recording and reproducing head and the TV's flyback transformer can be placed away from each other at the farthest distance possible in the cabinet and thereby it is possible to avoid alignment of the magnetic fluxes from the TV's flyback transformer and the VTR's head in the same direction, whereby the noise from the TV's flyback transformer can readily be prevented from entering the VTR's head; moreover, tuning the TV by adjusting screws on the TV's printed circuit board or connecting and assembling the circuit can be conducted very easily as required. In addition, the vertical dimension of the cabinet can be reduced so much that the compound set can be manufactured in a more compact form than ever.

Since rectangular bodies, attached to the end of a holder for vertically supporting the TV's printed circuit board, are provided with projections elastically pressed against the inside of rails by the restoring force of narrow portions between the projections and holes just thereunder, the rectangular bodies are firmly put in the rails; therefore, even though the rails are a mold of plastic or metal, there will never appear any backlash between the rectangular bodies and the rails, whereby no jerkiness of the printed circuit board happens and the smooth insertion or withdrawing of the rectangular bodies from the rails can be conducted very easily.

Also, a rib on a holding plate for carrying the flyback transformer can be fixed by putting in between a pair of separable front and rear halves of the cabinet with a single fastener that joins the same halves, so that not only can the cabinet and the flyback transformer be secured to each other strongly but also the simplicity of the assemblage of the compound set and the reduction of its production cost can be realized.

OBJECTS OF THE INVENTION

It is an object of the invention to provide a TV-VTR compound set in which a holder for supporting the TV's printed circuit board in a space between the inside surface of the cabinet and TV's CRT vertically and TV's flyback transformer laterally is newly introduced, by which holder the TV's flyback transformer and VTR's picture recording and reproducing head come to be placed apart from each other at the farthest distance possible in the cabinet and the transformer's noise comes to be prevented from interfering with the head.

It is another object of the invention to provide a TV-VTR compound set in which a holder for supporting TV's printed circuit board in a space between the inside surface of the cabinet and the TV's CRT vertically and the TV's flyback transformer laterally is newly introduced, by which not only is the TV's transformer's noise prevented from entering the VTR's head as mentioned above but also the dimension of the cabinet can be made smaller than that of the conventional cabinet similarly housing a TV and VTR and the production cost of the set can be reduced.

The above and other objects and features of the invention will appear more fully from a consideration of the following description taken in connection with the accompanying drawing.

THE DRAWINGS

PREFERRED EMBODIMENT OF THIS INVENTION

Figure 1:
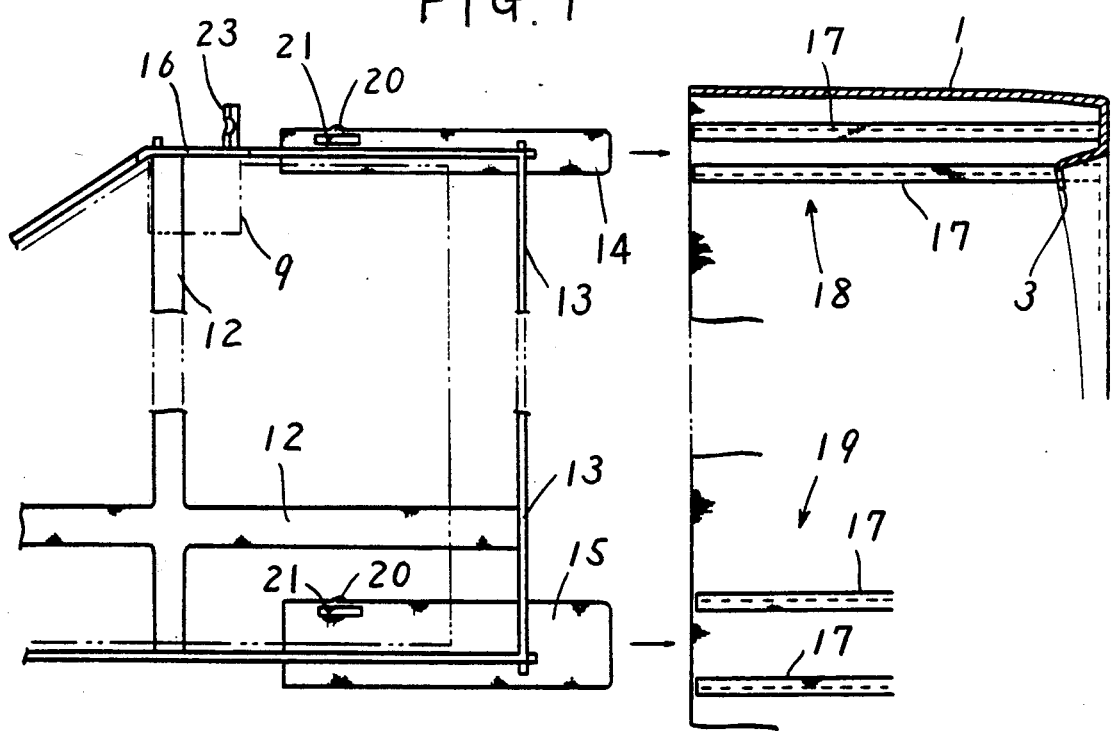
FIG. 1 is a sectional side view of front (right) and rear (left) halves of the cabinet that build up the outside frame work of a TV-VTR compound set of this invention.
Figure 2:
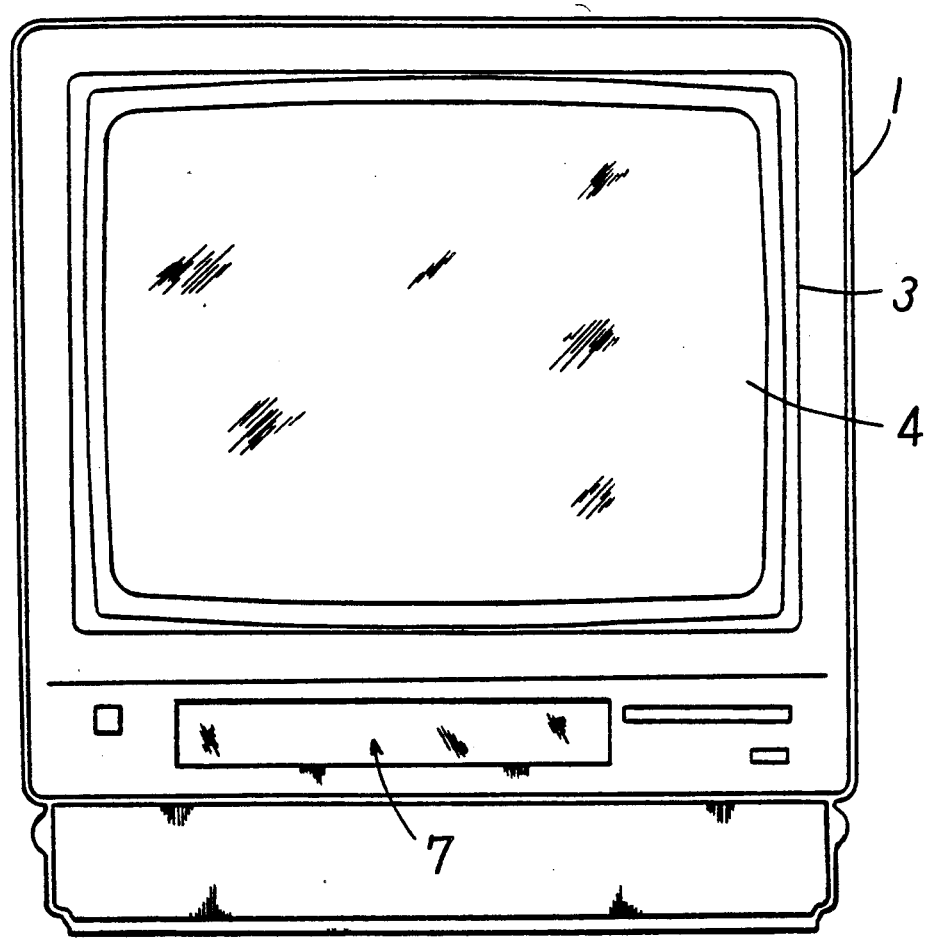
FIG. 2 is a front view of the same TV-VTR compound set.
Figure 3:
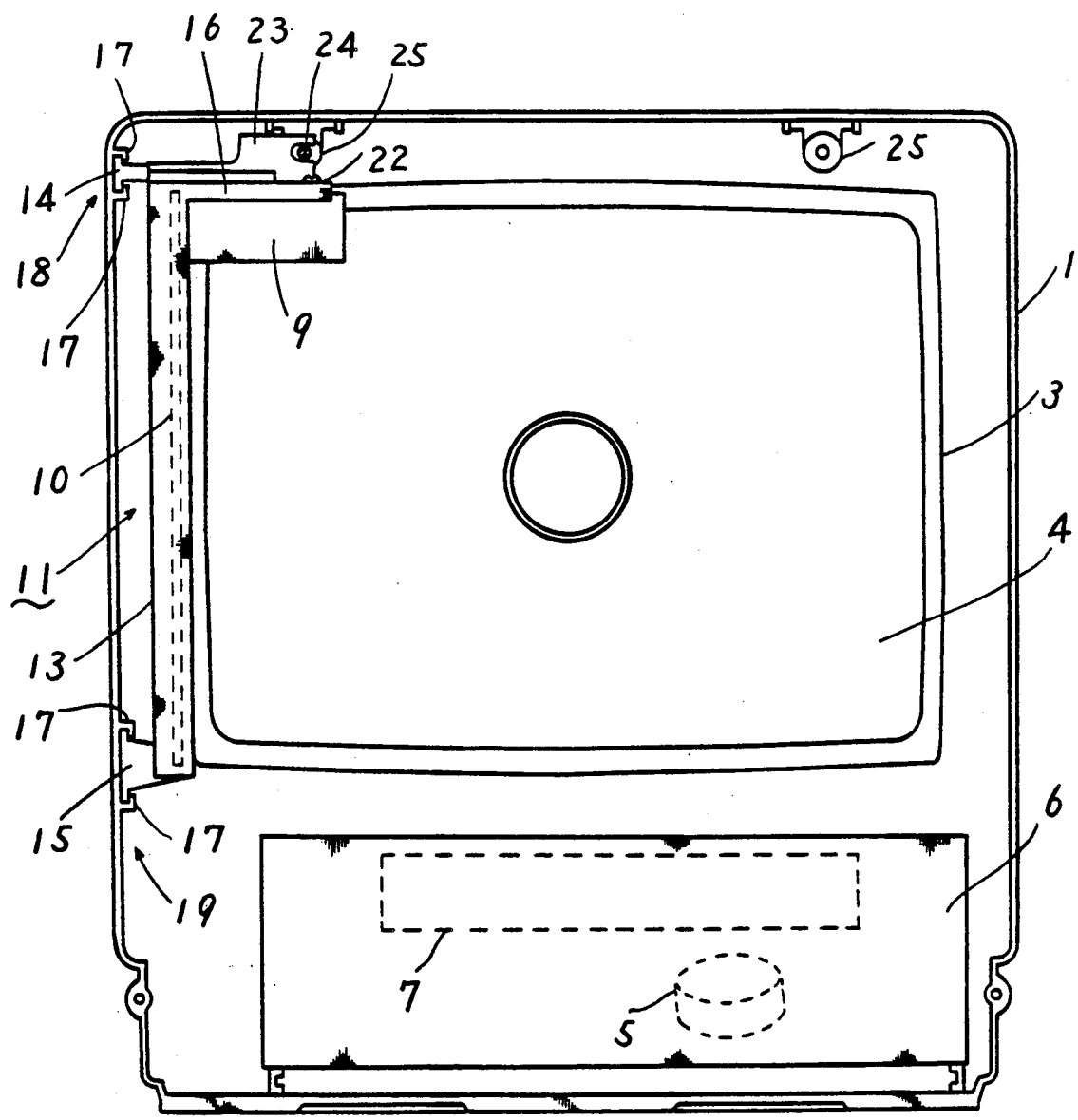
FIG. 3 is a rear view of the same TV-VTR compound set.

Front and rear halves 1, 2 of FIG. 1 of the cabinet form the outside frame work of a TV and VTR compound set of this invention are generally made of plastic. As for the front half, the TV's CRT 4 of FIG. 2 is fitted in an essentially square window 3 and the VTR 6 of FIG. 3 is provided with a picture recording and reproducing head 5 disposed on the bottom of the front half 1. A video cassette tape 8 can be put in or taken out through a laterally elongated window 7 provided on the front face thereof.

Figure 4:
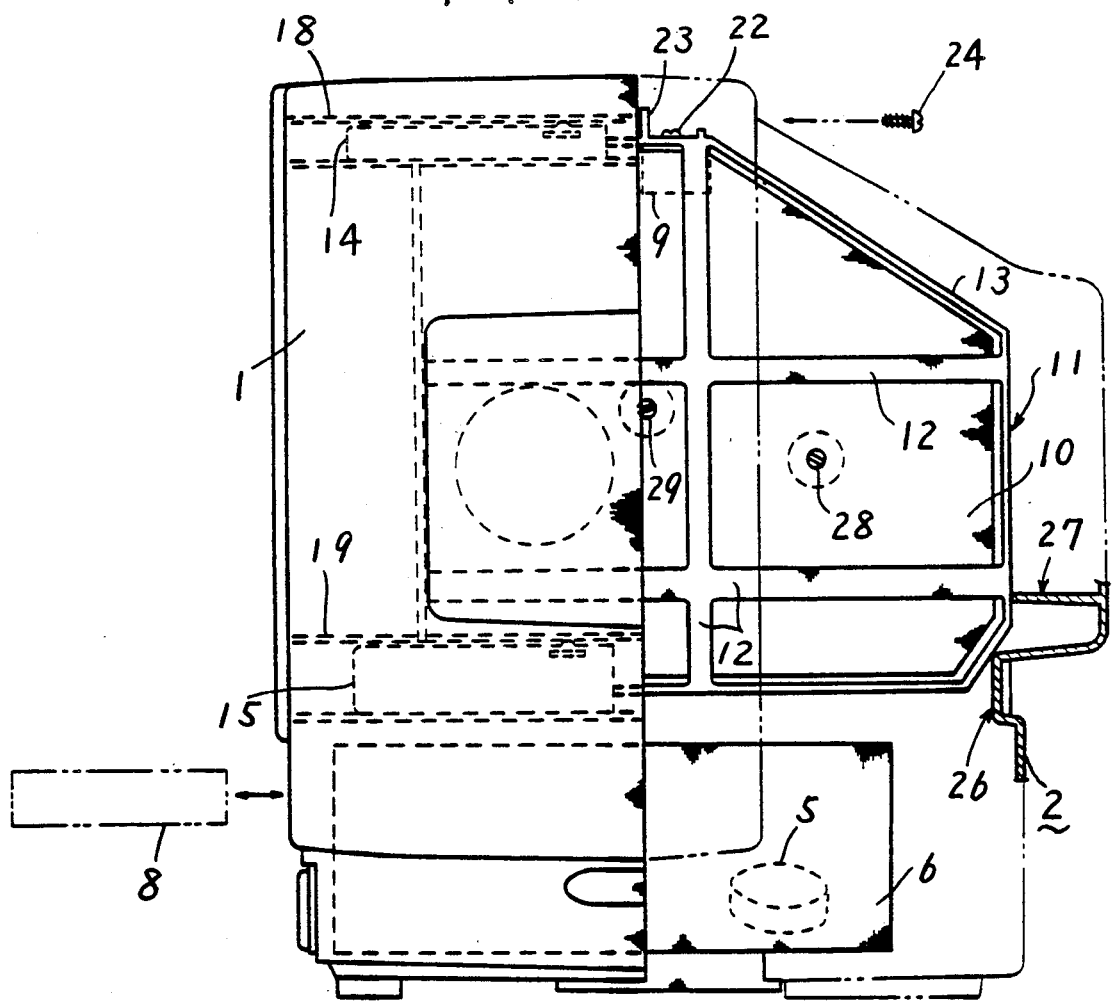
FIG. 4 is a side view of the same TV-VTR compound set, in which it is illustrated that a portion of the rear half (right), shown by dotted lines, is put in the front half (left) of the cabinet.

A TV printed circuit board 10 is fixed to one side of a plastic molded lattice type frame 12 of FIG. 4 close to the CRT. Each end of the frame 12 is joined to a frame 13 to comprise a single molded holder, see FIG. 1. A pair of upper and lower rectangular bodies 14, 15 and a plate 16 for holding a flyback transformer 9 are also molded in one with the frames 12 and 13, all of which is hereinafter collectively called a holder 11. Two pairs of upper and lower rails 18, 19, each formed by a pair of inwardly bent L-shaped projections 17, 17, are provided on the inside surface of the front half 1 of the cabinet so as to form a mortise cavity for receiving an end of each rectangular body 14, 15. Thus, the rectangular bodies can be put in or taken out from the rails 18, 19 in a stable manner.

The TV printed circuit board 10, mounted on the lattice type frame 12, is vertically put in a narrow space between the inside surface of the cabinet and the CRT, almost parallel to the inside surface of the cabinet. According to this example, the TV printed circuit board 10 is located on the left of the CRT, but may be located on the right thereof, as a matter of course. The lattice type frame 12 of the holder 11 is supported by the respective coupling of the rectangular bodies 14, 15 with the rails 18, 19, vertically to the bottom of the cabinet.

As shown in FIG. 1, projections 20, 20, to be pressed against the inside of each upper rail 17, are provided on the upper surface of the rectangular bodies 14, 15 and holes 21, 21 are also bored in the rectangular bodies just under the projections 20, 20. The structure of this portion is such that the projections 20, 20 are elastically pressed against the inside of each upper rail 17 by the elastically recovering force of narrow spring material between the projections 20, 20 and the holes 21, 21. Because of that, even though there is some clearance between the rails 18, 19 and the rectangular bodies 14, 15 due to the draft in molding, it does not matter.

The flyback transformer 9 is mounted on the lower surface of the holding plate 16 with a fastener 22 so that its magnetic flux is oriented in the lateral direction. A reinforcing rib 23 is provided on the upper surface of the holding plate 16 so that it reaches to the rear end of a boss 25 of FIG. 3 which is provided to the inside upper surface of the front half 1 of the cabinet. The rear half 2 and the front half 1 of the cabinet are coupled to each other with another fastener 24 which is inserted in a threaded hole in the boss 25 through the reinforcing rib 23 from the back.

Briefly, the reinforcing rib 23 on the plate 16 for holding the flyback transformer 9 is firmly sandwiched between the front half 1 and the rear half 2 of the cabinet by the fastener 24 screwed into the hole of the boss 25 and thereby the holder 11 for the printed circuit board 10, which comprises the lattice type frame 12, the surrounding frame 13, the rectangular bodies 14, 15 and the holding plate 16, is also strongly supported.

As shown in FIG. 3, a picture recording and reproducing head 5 of the VTR 6 is put on the bottom of the rear half 2 of the cabinet near the other side thereof as to the location of the flyback transformer 9 so that the flyback transformer 9 and the head 5 are placed diagonally above and below to each other and the magnetic flux of the head 5 is in the vertical direction. Since the magnetic flux of the flyback transformer 9 is in the lateral direction as mentioned above and the flyback transformer 9 and the VTR's picture recording and reproducing head 5 are placed apart from each other at the farthest distance possible in the cabinet as such, the noise generating from the flyback transformer 9 is prevented from entering VTR's picture recording and reproducing head 5 and causing interference therewith according to this invention.

As shown in FIG. 4, two ribs 26, 27 are molded on the inside of rear portions of the rear half cabinet 2. They are brought into contact with the holder 11 from diagonally below and from the back respectively so that the rear lower end of the holder 11 is also firmly supported by the rear half cabinet 2.

Also, two screws 28, 29 for adjusting the vertical synchronization and the brightness of pictures displayed on the CRT are provided on the TV's printed circuit board 10, so that the displayed pictures can be adjusted by turning the screws under careful watch with the rear half cabinet 2 being separated from the front half cabinet 1.

Figure 5:
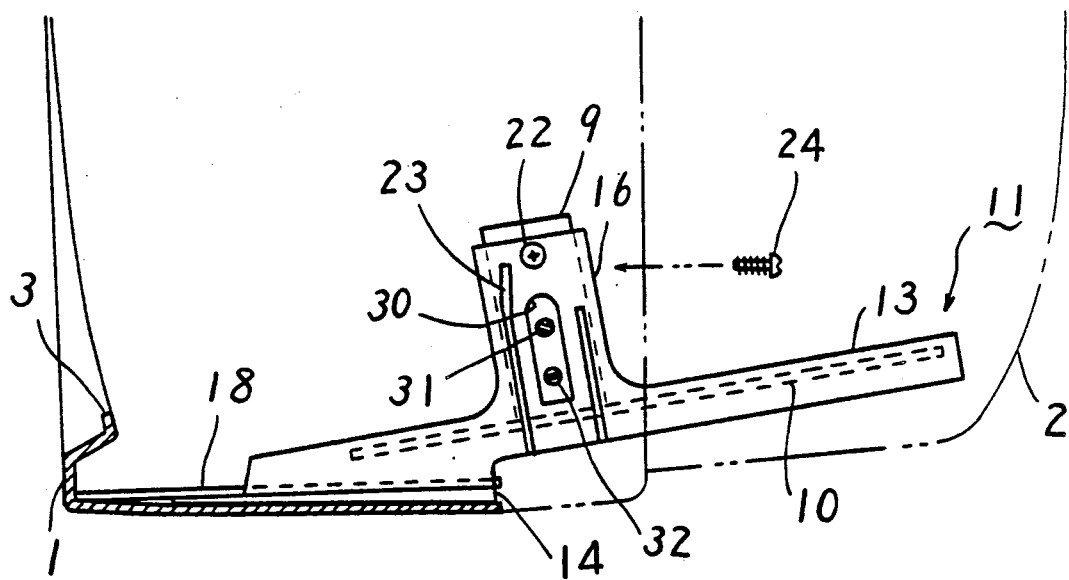
FIG. 5 is a plan view of a holder for supporting TV's printed circuit board and a plate for mounting a flyback transformer on its lower surface, the holder being comprised essentially of a lattice type frame, a frame surrounding the same and rectangular bodies.

As shown in FIG. 5, an elongated opening 30 is provided on the holding plate 16, under surface of which the flyback transformer 9 is mounted on. Thus, screws 31, 32 of the flyback transformer 9 are also accessible through that opening with the rear half cabinet 2 being separated from the front half cabinet 1 when the focus of pictures on the CRT have to be adjusted.

Briefly, according to this invention, TV's CRT 4 is disposed in the upper part and VTR 6 is put on the bottom of the front half of the cabinet. The TV's printed circuit board 10 is vertically supported by the holder 11, which is fixed to the inside of the front half of the cabinet by the engagement of its rectangular bodies 14, 15 with the rails 18, 19 and put in a narrow space between the inside surface of the front half cabinet and the CRT. The VTR 6 and TV printed circuit board 10 are connected to each other by wire so as to be able to receive TV broadcasting or reproduce images thereof on the CRT in accordance with recorded signals on a videotape. The screws 28, 29, 31, 32 are accessible from the side of the cabinet and through the opening 30 before the rear half 2 of the cabinet is joined to the front one 1 with the fastener 24 screwed into the boss 25 through the rib 23.

As best seen from the above, according to this invention, the VTR's picture recording and reproducing head 5 and the TV's flyback transformer 9 are located away from each other at the farthest distance possible in the cabinet and the direction of the flyback transformer's magnetic flux is deviated so as not to be in line with that of VTR's head's magnetic flux, by which the noise from the flyback transformer is prevented from interfering with the action of VTR's head.

Additionally, since the TV's printed circuit board is vertically put in a space between the inside surface of the cabinet and the CRT, the dimension of the cabinet can be reduced in the vertical direction much more than that of conventional cabinets, in which the TV printed circuit board is horizontally placed between the CRT and VTR.

The holder 11 for supporting the TV printed circuit board is a lattice type frame 12 including a surrounding frame 13. The rectangular bodies 14, 15 are molded as part of the frame 12 and devised to be firmly coupled with and freely slid on the rails 18, 19, supported by the elastic force of the projections 20, 20, which originates from the restoring force of narrow spring portions between the projections 20, 20 and the holes 21, 21 just thereunder in the rectangular bodies.

The rib 23 is molded as one piece with the holding plate 16 for the flyback transformer 9. It is put between the front half 1 and the rear half 2 of the cabinet and firmly secured to them with a single fastener 24 so that it can simplify the cabinet structure and readily reduce the production cost to a great extent.

What is claimed is:

1. A TV and VTR compound set including a common cabinet, a TV printed circuit board and a TV cathode ray tube, in which said VTR is disposed on the bottom of said cabinet under said TV cathode ray tube, comprising:

rails positioned on a common inside vertical wall of said cabinet;

a holder for supporting said TV printed circuit board vertically between the inside surface of said cabinet and said cathode ray tube by means of said rails so as to be slidable on them;

said holder including members engaging said rails; said members including projections elastically pressed against the inside of said rails for making said holder stable and firmly coupled with and freely slidable on said rails.

2. A TV and VTR compound set including a cabinet comprised of a front and a rear half, comprising:

a rib;

a holding plate secured to said rib;

a flyback transformer secured to said holding plate; and a single fastener for joining said front half and said rear half of said cabinet to each other and said rib with said rib between said front half and said rear half of said cabinet.

3. A combined television and videotape recorder, including a cathode ray tube, a television circuit board, a videotape recorder, and a cabinet, wherein said videotape recorder is disposed on the bottom of said cabinet under said cathode ray tube, comprising:

rails on the inside of said cabinet;

a holder slidably received by said rails for supporting said television circuit board vertically in a space between the inside surface of said cabinet and said cathode ray tube;

slides on said holder for engaging said rails; and projections elastically pressed from said slides against the inside of said rails.

4. A combined television and videotape recorder as defined in claim 3, further comprising:

a rib;

said rib including a plate for holding a flyback transformer;

said cabinet comprising a front half and a rear half;

said rib including support means dimensioned to fit between said front and rear halves of said cabinet; and a fastener for holding together said rib support means and said front and rear halves of said cabinet.

* * * * *